(12) United States Patent
Taniguchi et al.

(10) Patent No.: US 7,737,458 B2
(45) Date of Patent: Jun. 15, 2010

(54) LIGHT EMITTING DEVICE HAVING A STRAIGHT-LINE SHAPE

(75) Inventors: Reiko Taniguchi, Osaka (JP); Masayuki Ono, Osaka (JP); Shogo Nasu, Hyogo (JP); Eiichi Satoh, Osaka (JP); Toshiyuki Aoyama, Osaka (JP); Kenji Hasegawa, Osaka (JP); Masaru Odagiri, Hyogo (JP)

(73) Assignee: Panasonic Corporation, Osaka (JP)

( * ) Notice: Subject to any disclaimer, the term of this patent is extended or adjusted under 35 U.S.C. 154(b) by 171 days.

(21) Appl. No.: 12/036,671

(22) Filed: Feb. 25, 2008

(65) Prior Publication Data

US 2009/0213615 A1    Aug. 27, 2009

(51) Int. Cl.
*H01L 33/00* (2010.01)
(52) U.S. Cl. .............................. 257/98; 257/88; 257/91; 438/680; 438/681; 362/555
(58) Field of Classification Search .................. 257/88, 257/91, 98; 438/680, 681, 685; 362/555
See application file for complete search history.

(56) References Cited

U.S. PATENT DOCUMENTS

| | | | |
|---|---|---|---|
| 6,723,642 B1 * | 4/2004 | Lim et al. | 438/680 |
| 7,126,153 B2 * | 10/2006 | Iechi et al. | 257/40 |
| 7,288,797 B2 * | 10/2007 | Deguchi et al. | 257/99 |
| 7,361,413 B2 * | 4/2008 | Kinlen | 428/690 |

FOREIGN PATENT DOCUMENTS

| | | |
|---|---|---|
| JP | 4-109589 | 4/1992 |
| JP | 2005-209734 | 8/2005 |
| JP | 2005-294415 | 10/2005 |

OTHER PUBLICATIONS

Katayama, K., et al., "ZnSe-based white LEDs", Journal of Crystal Growth 214/215, 2000, pp. 1064-1070, Elsevier Science B.V.
Schwarz, R., et al., "OHMIC Contacts To *P*-ZnSe Using PD Metallization", Solid-State Electronics, 1998, pp. 139-144, vol. 42, Elsevier Science.

* cited by examiner

*Primary Examiner*—Phuc T Dang
(74) *Attorney, Agent, or Firm*—McDermott Will & Emery LLP

(57) ABSTRACT

A light emitting device having a straight-line shape is provided with: a pair of first and second electrodes each having a straight-line shape which face each other; and a phosphor layer having a straight-line shape provided so as to be sandwiched between the pair of electrodes, wherein at least one of the pair of first and second electrodes is a transparent electrode, at least one buffer layer is provided so as to be sandwiched between the first or second electrode and the phosphor layer, and the buffer layer makes the height of a potential barrier between the electrode and the phosphor layer which sandwich the buffer layer lower than the height of a Schottky barrier when the electrode and the phosphor layer are brought into direct contact.

16 Claims, 14 Drawing Sheets

LIGHT EMISSION

LIGHT EMISSION

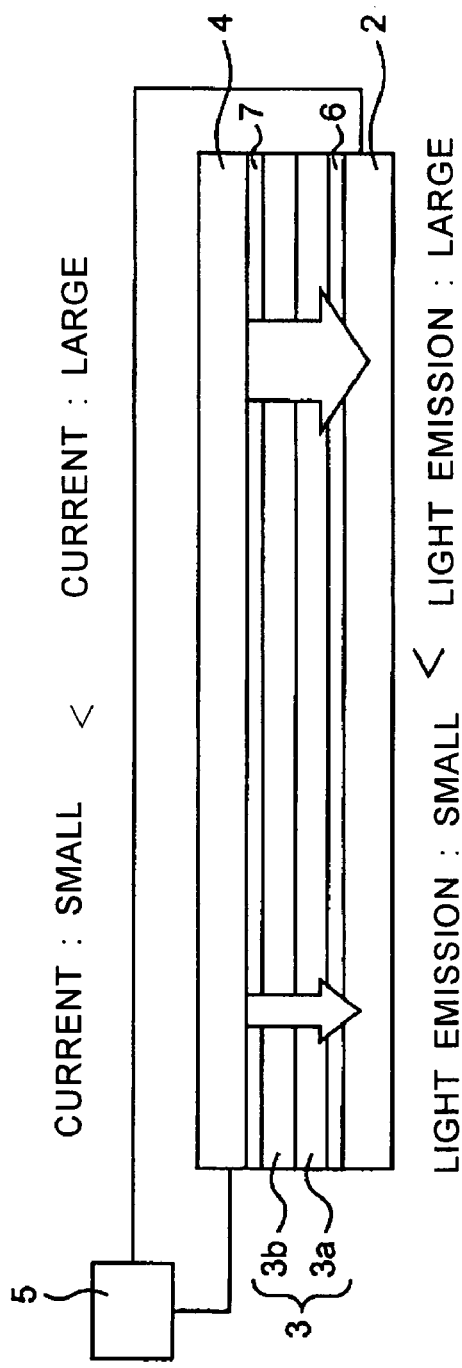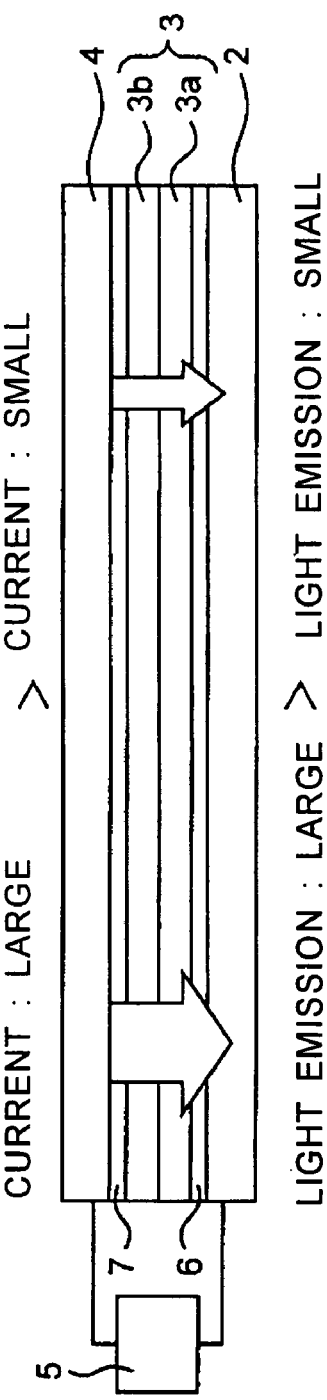

Fig. 14 *Prior Art*
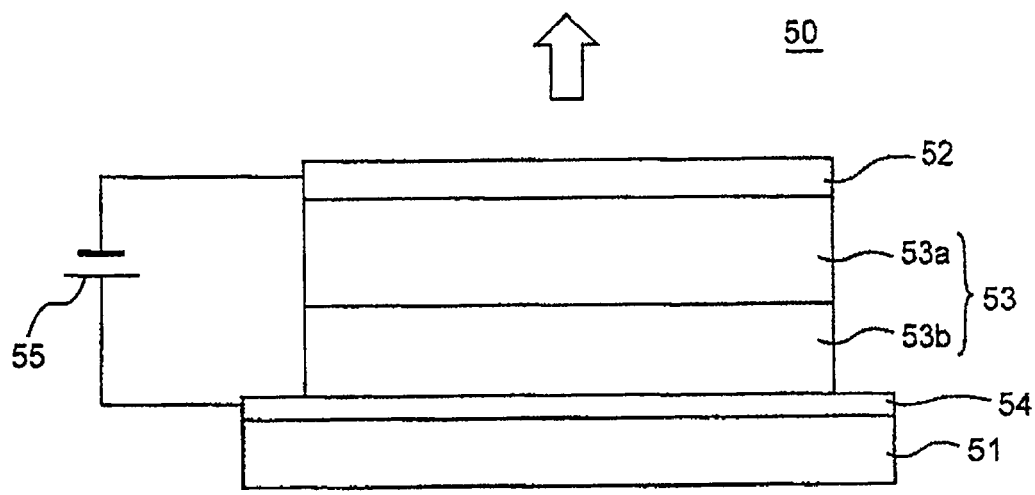

LIGHT EMITTING DEVICE HAVING A STRAIGHT-LINE SHAPE

BACKGROUND

1. Technical Field

The present invention relates to a light emitting device having a straight-line shape using an electroluminescent element.

2. Description of the Related Art

A conventional semiconductor light emitting element operates at a low voltage and has high brightness. However, since the element is a light source having a spot shape, it is difficult to use the element as a light source having a straight-line shape or a light source having a plane shape. Furthermore, an expensive substrate is necessary for the fabrication of a light emitting element, which is one factor that increases the cost. In addition, in the case of a thin film type light emitting element, a Schottky barrier is generated at the interface at which a phosphor layer and an electrode are joined, and there is a problem where the injection of carriers is prevented.

FIG. 14 is a schematic configuration diagram showing a configuration of a conventional light emitting element 50. A phosphor layer 53 has a configuration of a recombination type phosphor layer and the phosphor layer 53 having a two-layer structure of an n type semiconductor layer 53a and a p type semiconductor layer 53b is provided. A transparent electrode 52 which is functioned as an electron injecting electrode and a rear surface electrode 54 which is functioned as a hole injecting electrode are electrically connected via a direct current source 55. When power is supplied from the direct current source 55, a potential difference is generated between the transparent electrode 52 and the rear surface electrode 54 and a voltage is applied across the phosphor layers 53a and 53b. Thus, the phosphor layers 53a and 53b placed between the transparent electrode 52 and the rear surface electrode 54 emit light, and the light transmits through the transparent electrode 52 to be emitted to the outside of the light emitting element 50.

Here, depending on the combination of a semiconductor and an electrode, a Schottky barrier is generated at the interface through which the two are joined, the efficiency of injection of electrons and holes into the phosphor layer 53a and 53b, respectively, is decreased. Thus, the system is prevented from becoming more efficient. The problems concerning the Schottky barrier at this joint interface are described in reference to energy band diagrams in FIGS. 15A, 15B, 16A and 16B.

FIGS. 15A and 15B are energy band diagrams before and after contact in the case where an n type semiconductor layer 53a and a transparent electrode 52 are brought into contact with each other. Before contact, as shown in FIG. 15A, the semiconductor and the electrode exhibit different Fermi levels relative to the vacuum level. When the semiconductor and the electrode are brought into contact with each other, as shown in FIG. 15B, the band of the n type semiconductor layer 53a is curved on the contact surface so that the respective Fermi levels coincide with each other, and a large Schottky barrier is generated between the n type semiconductor layer 53a and the transparent electrode 52 after contact. Therefore, the efficiency of injection of electrons from the transparent electrode 52 to the n type semiconductor layer 53a is decreased. In addition, a metal oxide, such as ITO, for example, is used as the transparent electrode 52. Since the work function of such a material is generally relatively large, for example, 4 eV to 5 eV, a large Schottky barrier is generated between the n type semiconductor layer 53a and the transparent electrode 52.

In addition, FIGS. 16A and 16B are energy band diagrams before and after contact in the case where a p type semiconductor layer 53b and a rear surface electrode 54 are brought into contact with each other. In the case of the p type semiconductor layer 53b, when the semiconductor and the electrode are brought into contact with each other in the same manner as in the case of the n type semiconductor layer 53a, the band of the p type semiconductor layer 53b is curved on the contact surface so that the respective Fermi levels coincide with each other. Therefore, as shown in FIG. 16B, a large Schottky barrier is generated between the p type semiconductor layer 53b and the rear surface electrode 54 and the efficiency of injection of holes from the rear surface electrode 54 to the p type semiconductor layer 53b is decreased.

In order to solve the above-described problems, the following methods are generally used.

(1) A material having a large work function is used as a hole injecting electrode.

In addition, a material having a small work function is used as an electron injecting electrode.

(2) A layer which is doped with a high concentration is formed in an interface between an electrode and a semiconductor (see, for example, Japanese Patent Laid-open Publication No. 2005-294415, and J. Crystal Growth 214/215, p. 1064 (2000)).

(3) A Schottky barrier is made smaller through a reaction in which an electrode material and a semiconductor form an alloy (see, for example, Solid-State Electronics, Vol. 42, No. 1, pp 139-144, 1998).

SUMMARY OF THE INVENTION

In the case of, for example, Method (1), however, when a substance having a small work function is particularly used as an electrode, the substance having a small work function has generally low stability in the air. Thus, there is a problem where the substance cannot make practical use. In addition, Methods (2) and (3) have a high probability where it becomes necessary to review the conditions for processing whenever a material or a composition of a semiconductor that forms a phosphor layer varies.

In order to solve these problems, an object of the present invention is to provide a light emitting device having a straight-line shape where a large Schottky barrier generated between an electrode and a semiconductor layer is reduced and the efficiency of injection of electrons or holes into a phosphor layer is increased.

The light emitting device having a straight-line shape according to the present invention is provided with: a pair of first and second electrodes each having a straight-line shape which face each other; and a phosphor layer having a straight-line shape provided so as to be sandwiched between the pair of electrodes, wherein at least one of the pair of first and second electrodes is a transparent electrode, and the light emitting device provided with at least one buffer layer provided so as to be sandwiched between the first or second electrode and the phosphor layer, wherein the buffer layer makes the height of a potential barrier between the electrode and the phosphor layer which sandwich the buffer layer lower than the height of a Schottky barrier when the electrode and the phosphor layer are brought into direct contact.

In addition, the first and second electrodes are provided to have an electrical resistance value between the first and second electrodes which may vary in a longitudinal direction in the phosphor layer.

Furthermore, the phosphor layer may be partitioned into a plurality of regions by a plurality of insulators provided between the pair of electrodes.

Moreover, the film thickness may vary in the longitudinal direction in the phosphor layer.

In addition, an electrical resistance adjusting layer provided so as to be sandwiched between at least one electrode of the first and second electrodes and the phosphor layer and having a variable electrical resistance value in the longitudinal direction may be further provided. Here, the film thickness of the electrical resistance adjusting layer may vary in the longitudinal direction.

Furthermore, a terminal which is connected to a power supply may be provided at one end of the two ends in the longitudinal direction of the transparent electrode.

Moreover, a direct current voltage may be applied between the rear surface electrode and the transparent electrode to emit light. In this case, one electrode of the rear surface electrode and the transparent electrode functions as an electron injecting electrode and the other electrode functions as a hole injecting electrode. Furthermore, the buffer layer may be provided with two buffer layers: a first buffer layer provided between the first electrode, which is the electron injecting electrode, and the phosphor layer; and a second buffer layer provided between the second electrode, which is the hole injecting electrode, and the phosphor layer. Alternatively, the buffer layer may be provided with at least one buffer layer of: a first buffer layer provided between the first electrode, which is the electron injecting electrode, and the phosphor layer; and a second buffer layer provided between the second electrode, which is the hole injecting electrode, and the phosphor layer.

In addition, the first buffer layer may include a substance having a work function of 3.5 eV or lower.

Furthermore, the second buffer layer may include a substance having a work function of 5.0 eV or higher.

Moreover, the first buffer layer may include an alkali metal oxide. Alternatively, the first buffer layer may be formed of a substance having an electronegativity of 3 or more.

In addition, the phosphor layer may be a two-layer type phosphor layer where an n type semiconductor layer and a p type semiconductor layer are stacked.

Furthermore, the phosphor layer may be a three-layer type phosphor layer formed of an n type semiconductor layer, a p type semiconductor layer, and an undoped semiconductor layer sandwiched therebetween.

Moreover, a color converting layer which faces the rear surface electrode and the transparent electrode and is placed to the front in a light emitting direction from the phosphor layer may further be provided.

In addition, the light source having a plane shape according to the present invention is characterized by being provided with the light emitting device having a straight-line shape, and a light guide plate for reflecting light having a straight-line shape outputted from the light emitting device having a straight-line shape so as to convert the light in a straight-line shape into light in a plane shape.

According to the present invention, a light emitting device having a straight-line shape which uses a light emitting element having a long life and a high brightness of emitted light can be provided.

BRIEF DESCRIPTION OF THE DRAWINGS

Various objects, characteristics and advantages of the present invention will be clarified from preferred embodiments described below in reference to the accompanying drawings.

FIGS. 7A and 7B are schematic views showing a current density, which is uneven depending on the location of terminals in the light emitting device having a straight-line shape;

FIG. 14 is a schematic configuration diagram of a conventional light emitting element;

DETAILED DESCRIPTION OF THE PREFERRED EMBODIMENTS

Figure 1A:
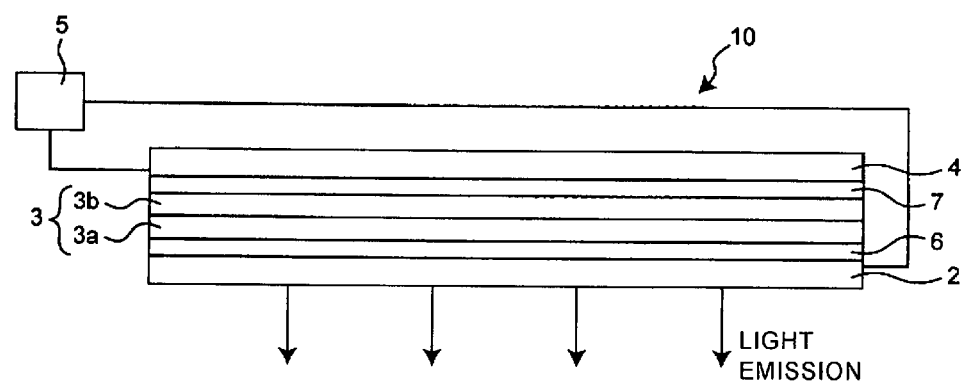
FIG. 1A is a schematic cross-sectional view showing a configuration of a light emitting device having a straight-line shape according to a first embodiment of the present invention.

Hereinafter, the best mode for carrying out the invention is described in reference to the accompanying drawings. Here, the same symbols are attached to essentially the same members in the drawings, and the descriptions thereof are not repeated.

First Embodiment

<Schematic Configuration of Light Emitting Device Having Straight-Line Shape>

Figure 1B:
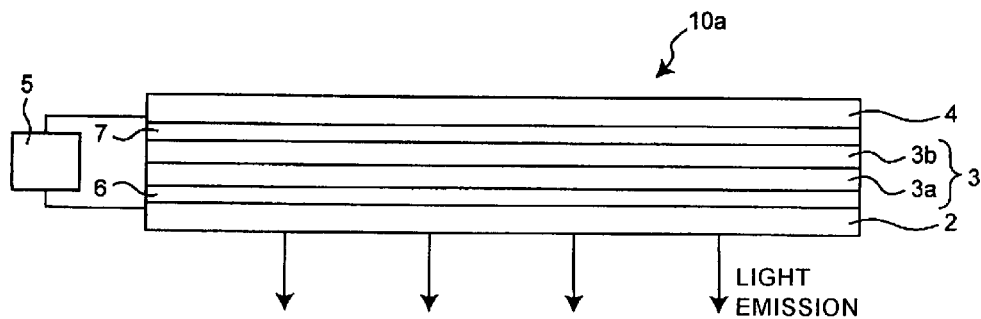
FIG. 1B is a schematic cross-sectional view showing a configuration of a light emitting device having a straight-line shape according to another embodiment.

FIG. 1A is a cross-sectional view schematically showing a configuration of a light emitting device having a straight-line shape 10 according to the first embodiment of the present invention. FIG. 1B is a cross-sectional view showing a light emitting device having a straight-line shape 10a in another example. This light emitting device having a straight line shape 10 includes a rear surface electrode (metal electrode) 4, a second buffer layer 7, a phosphor layer 3, a first buffer layer 6 and a transparent electrode 2 which are stacked in this order. The transparent electrode 2 and the rear surface electrode (metal electrode) 4 are electrically connected via a power supply 5. In this case, the transparent electrode 2, which is connected to a negative electrode side, functions as an electron injecting electrode (second electrode) and the rear surface electrode (metal electrode) 4, which is connected to a positive electrode side, functions as a hole injecting electrode (first electrode). In this light emitting device having a straight-line shape 10, the phosphor layer 3 has a two-layer type structure where an n type semiconductor layer 3a and a p type semiconductor layer 3b are stacked, wherein the electron injecting electrode is placed on an n type semiconductor layer side and the hole injecting electrode is placed on a p type semiconductor layer side. Here, terminals for connecting the respective electrodes 2 and 4 to the power supply are provided on different short sides in the light emitting device having a straight-line shape 10 in FIG. 1A, while terminals for connecting the respective electrodes 2 and 4 to the power supply are provided on the same short side in the light emitting device having a straight-line shape 10a. Thus, the two light emitting devices are different from each other.

In addition, the light emitting element 10 is characterized in that a first buffer layer 6 is provided between the transparent electrode 2, which is functioned as an electron injecting electrode (first electrode), and the n type semiconductor layer 3a, and a second buffer layer 7 is provided between the p type semiconductor layer 3b and the rear surface electrode 4, which is functioned as a hole injecting electrode (second electrode). In this manner, the first and second buffer layers 6 and 7 are inserted between the semiconductor layers 3a and 3b that form the phosphor layer 3 and the electrodes 2 and 4, respectively, and thus, as shown in the energy band diagrams in FIGS. 3 and 4, the height of the Schottky barrier between the transparent electrode 2 and the n type semiconductor layer 3a and the height of the Schottky barrier between the rear surface electrode 4 and the p type semiconductor layer 3b can be lowered, respectively. As a result, the efficiency of injection of electrons or holes into the phosphor layer 3 can be increased. Here, the effects of decreasing the Schottky barrier in a joint interface when the first and second buffer layers 6 and 7 are provided are described later.

Furthermore, in this light emitting element 10, the transparent electrode 2 and the rear surface electrode 4 are electrically connected via the direct current power supply 5. When power is supplied from the direct current power supply 5, a potential difference is generated between the transparent electrode 2 and the rear surface electrode 4 so that a voltage is applied to the phosphor layer 3. Thus, the phosphor layer 3 placed between the transparent electrode 2 and the rear surface electrode 4 emits light, and this light transmits through the transparent electrode 2 so as to be emitted to the outside of the light emitting device having a straight-line shape 10.

Furthermore, the invention is not limited to the above-described configuration, and the phosphor layer 3 may have a p-i-n type three-layer structure. The p-i-n type structure is a structure where an intrinsic semiconductor layer is inserted between a p type semiconductor and an n type semiconductor. Moreover, appropriate modifications are possible such that the phosphor layer 3 has a single layer structure, a plurality of pn junction films are provided, a plurality of layers having a p-i-n type structure are stacked, a plurality of thin dielectric layers are provided between the electrode and the phosphor layer for the purpose of limiting the current, the light emitting device is driven by an alternating current power supply, the rear surface electrode is also made transparent, the rear surface electrode is made to be a black electrode, a structure for sealing the entirety or part of the light emitting device having a straight-line shape is further provided, and a structure for converting the color of light emitted from the phosphor layer 3 is provided in the front towards the light emitting direction. A white light source having a straight-line shape can be provided by combining, for example, a blue phosphor layer and a layer for converting color from blue to green and red.

Hereinafter, the configuration of each component of this light emitting device having a straight-line shape 10 is described in detail.

Here, though FIG. 1 shows a configuration where the phosphor layer 3 is sandwiched between a pair of electrodes 2 and 4 with a substrate being omitted, a substrate 1 for supporting the entirety may be provided. A configuration may be provided where, for example, a transparent electrode 2 is placed on the substrate 1 and the phosphor layer 3 and the rear surface electrode 4 are stacked in this order on top of the transparent electrode 2.

<Substrate>

The substrate 1 can support layers which are formed on top of the substrate 1, and a material having high electrical insulating properties is used for the substrate 1. In addition, in the case where light is emitted from the substrate 1 side, a material is required to have light transmitting properties for the wavelength of light emitted from a light emitting body. As such a material, glass, such as Corning 1737, crystal and ceramic, for example, can be used. The material may be non-alkali glass or soda lime glass where a surface is coated with alumina as an ion barrier layer so that alkali ions, which are included in ordinary glass, do not affect the light emitting element. In addition, polyester, polyethylene terephthalate-based resins, combinations of a polychlorotrifluoroethylene-based resin and nylon 6, fluorine resin-based materials, and resins films of polyethylene, polypropylene, polyimide, polyamide, or the like, can be used. In the case where a resin film is used, it is preferable to use a material having excellent durability, flexibility, transparency, electrical insulating properties, and moisture-proof properties. Here, the above-described materials are examples, and the material for the substrate 1 is not particularly limited to these.

Here, in the case of a configuration where light is not emitted from the substrate 1 side, the above-described light transmitting properties are unnecessary, and therefore a material having no light transmitting properties can also be used. Examples of such a material include a metal substrate having an insulating layer on the surface, a ceramic substrate, a silicon wafer, and the like.

<Electrode>

The electrodes are the transparent electrode 2 on the side from which light is emitted and the rear surface electrode 4 on the other side. Here, though the substrate is omitted in FIG. 1, the rear surface electrode 4 may be provided, for example, on top of the substrate 1. In addition, the invention is not limited to this, and a configuration may be provided where, for example, the transparent electrode 2 is provided on top of the substrate 1, and the phosphor layer 3 and the rear surface electrode 4 are stacked in this order on top of the transparent electrode 2. Alternatively, the transparent electrode 2 and the rear surface electrode 4 may both be transparent electrodes.

Here, in the case where the direct current power supply 5 is connected between the two electrodes so that light is emitted by applying a direct current voltage across the two electrodes, one electrode connected to a negative electrode side functions as an electron injecting electrode, and the other electrode connected to a positive electrode side functions as a hole injecting electrode. In this case, whether the two electrodes function as an electron injecting electrode or a hole injecting electrode is irrelevant of whether the electrodes are either the transparent electrode 2 or the rear surface electrode 4, but is determined by the connection with the direct current power supply. That is, whether the electrodes are the transparent electrode 2 or the rear surface electrode 4 is determined by whether or not the electrodes transmit light or not, and whether the electrodes function as an electron injecting electrode or a hole injecting electrode is determined by the connection with the direct current power supply. In addition, the electron injecting electrode is placed on an n type semiconductor layer side, and the hole injecting electrode is placed on a p type semiconductor layer side.

First, the transparent electrode 2 is described below. A material for the transparent electrode 2 should have light transmitting properties so that light generated within the phosphor layer 3 can be emitted to the outside, and in particular, it is preferable that the transparent electrode 2 has a high transmittance in a visible light range. In addition, it is preferable that the electrode has a low resistance, and furthermore, it is preferable that the electrode has excellent adhesiveness to the substrate 1 and the phosphor layer 3. As particularly appropriate materials for the transparent electrode 2, metal oxides of which a main component is ITO ($In_2O_3$ doped with $SnO_2$, which is also referred to as indium tin oxide), InZnO, ZnO or $SnO_2$, metal thin films of Pt, Au, Pd, Ag, Ni, Cu, Al, Ru, Rh or Ir, and conductive polymers, such as polyaniline, polypyrrole, PEDOT/PSS and polythiophene, can be cited, but the invention is not limited to these. This transparent electrode 2 can be formed as a film in accordance with a film formation method, such as a sputtering method, an electron beam vapor deposition method and an ion plating method, in order to increase transparency or reduce a resistivity. In addition, a surface process, such as a plasma process, may be carried out in order to control a resistivity after film formation. The film thickness of the transparent electrode 2 is determined by a required sheet resistance value and a transmittance of visible light.

It is desirable that the carrier concentration in the transparent electrode 2 is in a range of 1E17 to 1E22 $cm^{-3}$. Further, it is desirable that the volume resistivity of the transparent electrode 2 is 1E-3 Ω·cm or lower and the transmittance for light with a wavelength from 380 to 780 nm is 75% or higher. In addition, the index of refraction of the transparent electrode 2 is preferably 1.85 to 1.95. Furthermore, in the case where the film thickness of the transparent electrode 2 is 30 nm or lower, a film having a high density and stable properties can be implemented.

In addition, any conductive material which is generally well-known can be applied to the rear surface electrode 4. Furthermore, it is preferable that such a material has excellent adhesiveness to the phosphor layer 3. Appropriate examples of the material include metal oxides, such as ITO, InZnO, ZnO and $SnO_2$, metals such as Pt, Au, Pd, Ag, Ni, Cu, Al, Ru, Rh, Ir, Cr, Mo, W, Ta and Nb, multi-layer structures thereof, conductive polymers, such as polyaniline, polypyrrole, PEDOT [poly(3,4-ethylenedioxythiophene)]/PSS (polystyrene sulfonate) and conductive carbon.

Here, the transparent electrode 2 and the rear surface electrode 4 may be provided in such a manner that the transparent electrode 2 is divided in an x direction and the rear surface electrode 4 is divided in a y direction, for example, so that they cross perpendicular to each other in order to control an area as a backlight. The control of the area can further reduce power consumption.

<Phosphor Layer>

Next, the phosphor layer 3 is described below. The phosphor layer 3 is a two-layer type phosphor layer where the n type semiconductor layer 3a and the p type semiconductor layer 3b are stacked.

A material for the n type semiconductor layer 3a is an n type semiconductor material of which major carriers are electrons and which exhibits n type conductivity. The optical band gap of the material preferably has a near ultraviolet range to a visible light range (1.7 eV to 3.6 eV), and more preferably a near ultraviolet range to a blue range (2.6 eV to 3.6 eV). Concretely, compounds of group 12 elements to group 16 elements, such as ZnS, which is described above, ZnSe, ZnTe, CdS and CdSe, mixed crystals thereof (for example, ZnSSe), compounds of group 2 elements to group 16 elements, such as CaS and SrS, mixed crystals thereof (for example, CaSSe), compounds of group 13 elements to group 15 elements, such as AlP, GaAs, GaN and GaP, mixed crystals thereof (for example, InGaN), and mixed crystals of any of the above described compounds, such as ZnMgS, CaSSe and CaSrS, can be used. In addition, chalcopyrite-type compounds, such as $CuAlS_2$, may be used. Furthermore, they may include one or more types of atoms or ions selected from the group consisting of Cu, Ag, Au, Al, Ga, In, Mn, Cl, Br, I, Li, Ce, Pr, Nd, Pm, Sm, Eu, Gd, Tb, Dy, Ho, Er, Tm and Yb as an additive. The type of these elements may also help to determine the color of the light emitted from the phosphor layer.

On the other hand, a material for the p type semiconductor layer 3b is a p type semiconductor material of which major carriers are holes and which exhibits p type conductivity. For this type of semiconductor material, compounds such as $Cu_2S$, ZnS, ZnSe, ZnSSe, ZnSeTe and ZnTe can be cited as examples. Though $Cu_2S$ and the like among these p type semiconductor materials intrinsically exhibit p type conductivity, one or more types of elements selected from nitrogen, Ag, Cu and In are used as additives for the other materials. In addition, a chalcopyrite-type compound, such as $CuGaS_2$ and $CuAlS_2$, which exhibit p type conductivity, may be used. Furthermore, a nitride, such as GaN or InGaN, which includes Zn, Mg or the like as an additive, may be used.

<Buffer Layer>

Figure 3:
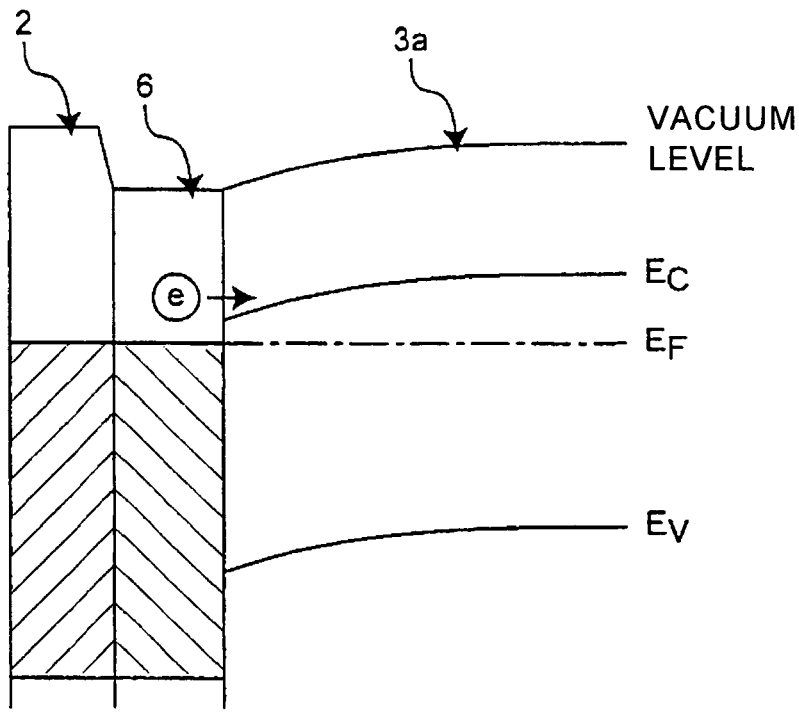
FIG. 3 is an energy band diagram between a first electrode, which is an electron injecting electrode, and an n type semiconductor layer in FIG. 1A.

The first buffer layer 6 is provided between the first electrode 2, which is an electron injecting electrode, and the n type semiconductor layer 3a. It is preferable to select a substance having a small work function so as to provide an ohmic junction with the n type semiconductor layer 3a, particularly, a substance having a work function of 3.5 eV or lower as the above-described first buffer layer 6. In this case, as shown in FIG. 3, the Schottky barrier between the first electrode (transparent electrode) 2, which is functioned as an electron injecting electrode, and the n type semiconductor layer 3a is small, and thus, electrons are efficiently injected from the first electrode 2. As the composition of this first buffer layer 6, a composition including one or more types among Al, Li, Al—Li and the like is desirable.

Figure 4:
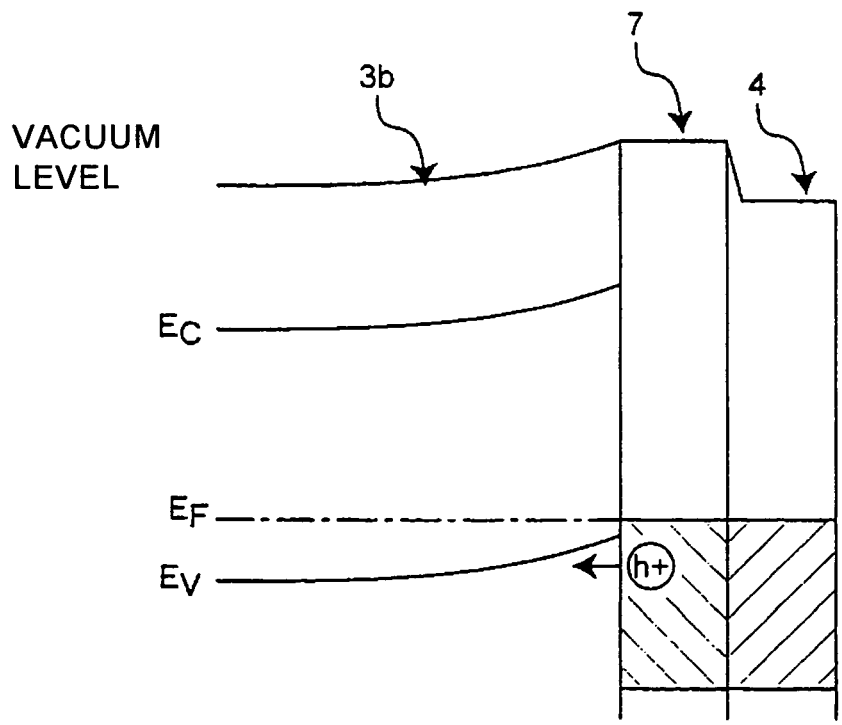
FIG. 4 is an energy band diagram between a second electrode, which is a hole injecting electrode, and a p type semiconductor layer in FIG. 1A.

In addition, the second buffer layer 7 is provided between the second electrode 4, which is a hole injecting electrode, and the p type semiconductor layer 3b. It is preferable to select a substance having a large work function so as to provide an ohmic junction with the p type semiconductor layer 3b, particularly, a substance having a work function of 5.0 eV or higher as the above-described second buffer layer 7. In this case, as shown in FIG. 4, the Schottky barrier between the second electrode (rear surface electrode) 4, which is functioned as a hole injecting electrode, and the p type semiconductor layer 3b becomes small, and thus, holes are efficiently injected from the second electrode 4. As a composition of this second buffer layer 7, a composition including one or more types of substances having a work function of 5 eV or higher, such as Pt and Au, is desirable.

<Manufacturing Method>

Next, a manufacturing method for the light emitting device having a straight-line shape 10 according to the first embodiment is described in the case where ZnS is used as each light emitting material for the semiconductor layers 3a and 3b in the phosphor layer 3. Here, it is possible to use the same manufacturing method in the case where a phosphor layer made of other materials described above is used.

(1) Corning 1737 is prepared as the substrate 1 having a straight-line shape (not shown in the drawings).
(2) The rear surface electrode 4 having a straight-line shape is formed on the substrate 1. For example, Al is used, and the film thickness is 200 nm.
(3) Pt is deposited on the rear surface electrode 4 as the second buffer layer 7 having a straight-line shape in accordance with a photolithographic method. The thickness of this is 400 nm.
(4) Next, ZnS is deposited on the Pt layer 7, which is a second buffer layer, in accordance with a vapor phase deposition method. As for conditions at this time, the temperature of the substrate is 600° C., and ZnS and Ag are deposited in a gas including NH3 in a thickness of 1 µm, and thus, a p type ZnS layer having a straight-line shape can be formed as the p type semiconductor layer 3b.
(5) ZnS and Ag are deposited on top of the p type ZnS layer 3b in accordance with a vapor phase deposition method. As for conditions at this time, the temperature of the substrate is 600° C., and the thickness of the deposited layer is 1 µm, and thus, an n type ZnS layer having a straight-line shape can be formed as the n type semiconductor layer 3a.
(6) Al is deposited on top of the n type ZnS layer 3a as the first buffer layer 6 in accordance with a sputtering method so as to have a thickness of 200 nm.
(7) Next, ITO is deposited on top of the Al layer 6, which is a first buffer layer, in accordance with a sputtering method as a transparent electrode 2 having a straight-line shape. The film thickness is 200 nm.
(8) Then, a transparent insulator layer of, for example, silicon nitride, or the like, is formed as a protective layer (not shown in the drawings) so as to cover the entirety.

The light emitting device having a straight-line shape 10 according to the present first embodiment can be produced in the above-described process.

The light emitting device having a straight-line shape 10 according to this first embodiment starts emitting light when the applied voltage is 15 V, and exhibited a brightness of light of approximately 600 $cd/m^2$ at 35 V when the transparent electrode 2 and the rear surface electrode 4 are connected to the direct current power supply 5 and a direct current voltage is applied between these electrodes to evaluate a light emitting performance.

Here, though in the present first embodiment, the first buffer layer 6 and the second buffer layer 7 are both provided in the configuration, just one may be provided. In addition, the method for forming a film in each layer is not limited to the above-described method.

<Effect>

It is not necessary to apply a high alternating current voltage to the light emitting device having a linear shape according to the present first embodiment, as in the case where a conventional EL element is used, and the requisite brightness can be gained for the emitted light with a low direct current voltage.

<Light Source Having a Plane Shape>

Figure 2A:
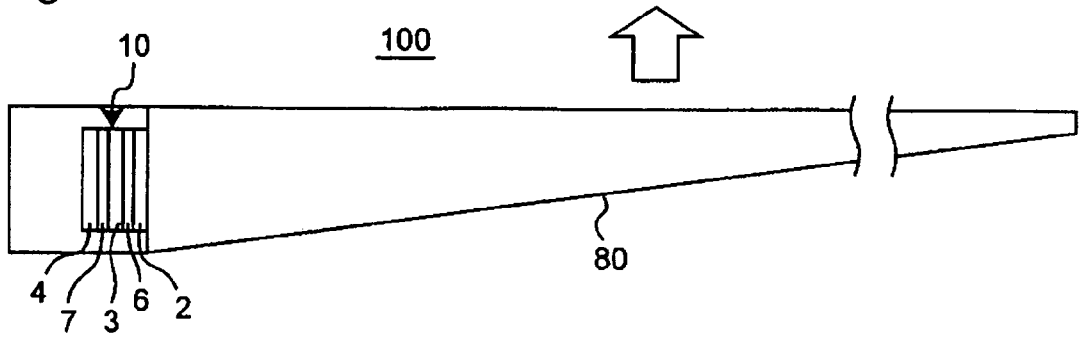
FIG. 2A is a front view showing a configuration of a light source having a plane shape using a light emitting device having a straight-line shape according to the first embodiment of the present invention as viewed in a direction perpendicular to a light emitting direction.
Figure 2B:
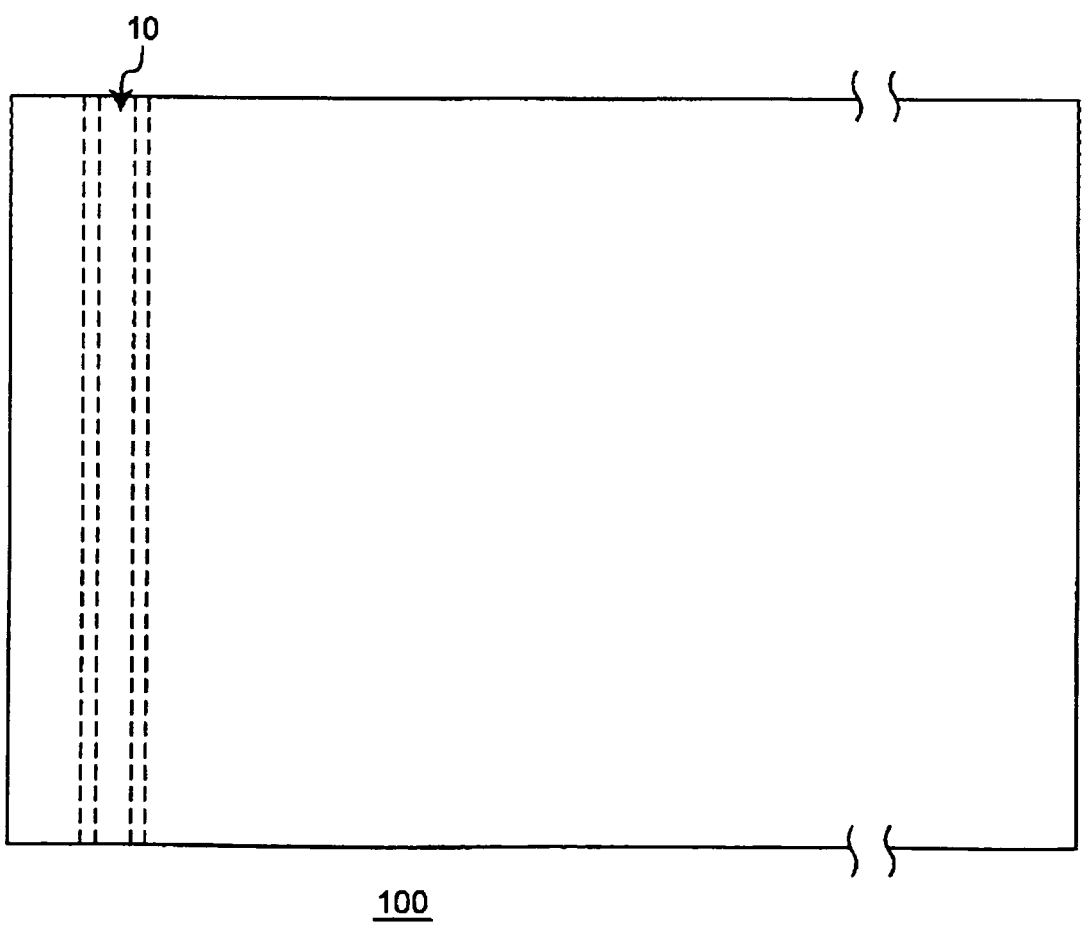
FIG. 2B is a plan view showing the light source having a plane shape as viewed in the light emitting direction.

FIG. 2A is a front view showing a configuration of a light source having a plane shape 100 using the light emitting device having a straight-line shape 10 according to the first embodiment of the present invention, and FIG. 2B is a plan view showing the same. This light source having a plane shape 100 is provided with the light emitting device having a straight-line shape 10 according to the first embodiment, and a light guide plate 80 for converting light in a straight-line shape emitted from the light emitting device having a straight-line shape 10 to light in a plane shape. In this light source having a plane shape 100, light in a straight-line shape outputted from the light emitting device having a straight-line shape is reflected from the surface of the light guide plate 80 on the bottom as shown in FIG. 2A, and light in a plane shape is emitted from the surface on the upper side as shown in FIG. 2A. The light emitting device having a straight-line shape 10 is arranged in such a manner that a longitudinal direction becomes parallel to the light emitting surface having a plane shape from the light source having a plane shape 100 through which light is emitted. In addition, a direction in which light in a plane shape is outputted from the light emitting device having a straight line shape 10 is parallel to the light emitting surface through which light in a plane shape is emitted from the light source having a plane shape 100. The light guide plate 80 is arranged to be slightly inclined in such a manner that an acute angle is formed with the light emitting surface through which light in a plane shape is emitted from the light source having a plane shape 100.

This light source having a plane shape 100 is formed using the light emitting device having a straight-line shape 10 according to the first embodiment, which is combined with the light guide plate 80 for converting light in a straight-line shape outputted from the light emitting device having a straight-line shape 10 to light in a plane shape, and therefore, can be made thin, and the cost can be kept low.

Here, in the light emitting device having a straight-line shape using an inorganic EL light emitting element as described above, the resistance in the phosphor layer is low. Therefore, in the case where the area of the phosphor layer is increased without otherwise changing the configuration in order to provide a light source having a plane shape and apply it as a backlight for a liquid crystal display or the like, there is too much of a current. Thus, it is difficult to use the light source as a light source having a plane shape. Therefore, in the case where the above-described light emitting device having a straight-line shape is used for a backlight or the like, it is desirable to use it as a light source having a straight-line shape which is combined with a light guide plate as described above, as cold cathode ray tubes, or to use it as a light source having a spot shape, as LED's.

Second Embodiment

<Schematic Configuration of Light Emitting Device Having a Straight-Line Shape>

The light emitting device having a straight-line shape according to the second embodiment is described below. The schematic configuration of this light emitting device having a straight line shape is shown in FIG. 1, as with the first embodiment. The light emitting device having a straight-line shape according to the present second embodiment is characterized in that an alkali metal oxide, such as CaO, BaO or SrO, is used for the first buffer layer 6a, as compared to the light emitting device having a straight-line shape according to the first embodiment. The present inventor have been found that alkali metal oxides have properties of apparently increasing the work function of the metal, which is an electron injecting electrode, and the invention is one inserted that first buffer layer 6a made of an alkali metal oxide between the first electrode (transparent electrode) 2, which is functioned as an electron injecting electrode, and the phosphor layer 3. Thus, an alkali metal oxide is used as the first buffer layer 6a, and as shown in the energy band diagram of FIG. 5, the Schottky barrier between the first electrode 2 and the phosphor layer 3 can be reduced. As a result, the efficiency of injection of electrons into the phosphor layer can be increased.

Figure 5:
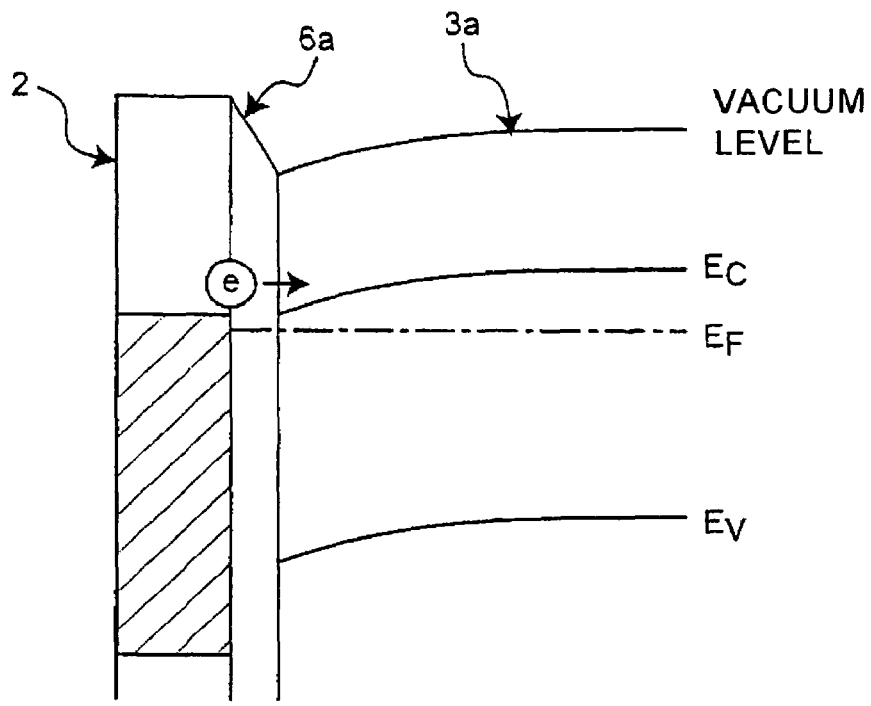
FIG. 5 is an energy band diagram between a first electrode, which is an electron injecting electrode, and an n type semiconductor layer in a light emitting device having a straight-line shape according to a second embodiment.

FIG. 5 is the energy band diagram in the case where an alkali metal oxide is used as the first buffer layer 6a. Though what is behind the effects of the alkali metal oxide, of apparently increasing the work function of the metal, as described above, is not yet clear, the present inventor considers this to be because strong polarization is caused in the oxide. The work function of the transparent electrode 2 appears to be smaller, and the contact between the transparent electrode 2 and the n type semiconductor layer 3a becomes ohmic. Here, there is a first buffer layer 6a, for example, of MgO, or the like, between the transparent electrode 2 and the n type semiconductor layer 3a, and in the case where the thickness of this first buffer layer 6a is sufficiently small, it is possible for electrons to move from the transparent electrode 2 to the n type semiconductor layer 3a, as a result of tunnel effects.

<Manufacturing Method>

Hereinafter, one example of the manufacturing method for the light emitting device having a straight-line shape according to the second embodiment in the case where ZnS is used as each light emitting material for the semiconductor layers 3a and 3b in the phosphor layer 3 is described. Here, the same manufacturing method can be used for phosphor layers made of other materials described above.

(1) Corning 1737 is prepared as the substrate 1.
(2) The rear surface electrode having a straight-line shape 4 is formed on the substrate 1. For example, Al is used, and the film thickness is 200 nm.
(3) Straight lines of ZnS are deposited on the rear surface electrode 4 in accordance with a vapor phase deposition method. As for conditions at this time, the temperature of the substrate is 600° C., and ZnS and Ag are deposited in a thickness of 1 µm in a gas including NH3, and thus, a p type ZnS layer is formed as the p type semiconductor layer 3b.
(4) Next, straight lines of ZnS and Ag are deposited on the p type ZnS layer 3b in accordance with a vapor phase deposition method. As for conditions at this time, the temperature of the substrate is 600° C., the thickness of deposition is 1 µm, and an n type ZnS layer can be formed as the n type semiconductor layer 3a.
(5) Next, a CaO layer having a straight-line shape is deposited on the n type ZnS layer 3a in accordance with a sputtering method as a first buffer layer in a thickness of 2 nm.
(6) Furthermore, a straight line of ITO is deposited in a thickness of 200 nm on top of the CaO layer 6a, which is a first buffer layer, as the transparent electrode 2 in accordance with a sputtering method.
(7) Subsequently, a transparent insulator layer of silicon nitride, or the like, is formed as a protective layer (not shown) which covers the entirety.

The light emitting device having a straight-line shape according to the present second embodiment can be produced through the above-described process.

When a light emitting performance when the transparent electrode 2 and the rear surface electrode 4 of the light emitting device having a straight-line shape are connected to the direct current power supply 5 and a direct current voltage is applied between these is evaluated, it has been found that light started being emitted when the applied voltage is 15 V, and a brightness of light emission of approximately 600 cd/m² is exhibited at 35 V.

Here, in the present second embodiment, the configuration is provided with only the first buffer layer 6a. However, the configuration may be provided with both the first buffer layer 6a and the second buffer layer 7. In addition, the method for forming a film in each layer is not limited to the method described above.

Third Embodiment

<Schematic Configuration of Light Emitting Device Having a Straight-Line Shape>

Figure 6:
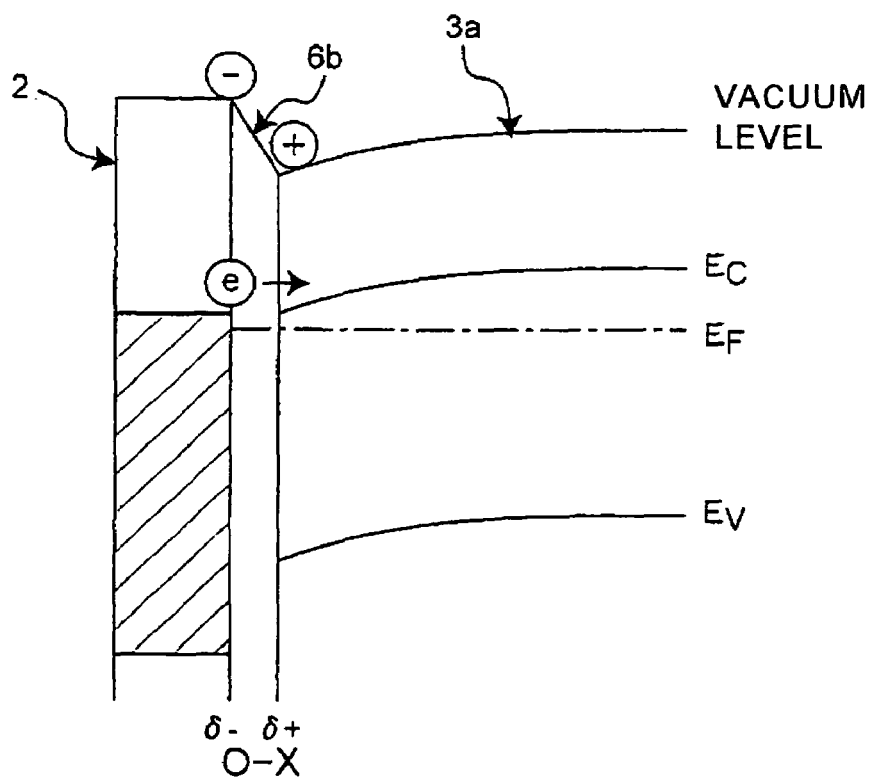
FIG. 6 is an energy band diagram between a first electrode, which is an electron injecting electrode, and an n type semiconductor layer in a light emitting device having a straight-line shape according to a third embodiment.

The light emitting device having a straight-line shape according to the third embodiment is described below. The schematic configuration of the light emitting device having a straight-line shape is shown in FIG. 1, as with the first embodiment. The light emitting device having a straight-line shape according to the present third embodiment is characterized in that the first buffer layer 6b is formed of a substance having an electronegativity as high as approximately 3 or more, such as oxygen or fluorine, as compared to the light emitting device having a straight-line shape according to the first embodiment. This substance having an electronegativity of 3 or more forms an electric dipole in the interface between the n type semiconductor layer 3a and the first buffer layer 6b. As a result of the effects of this electric dipole, the band on the transparent electrode 2 side is lifted, so that the height of the Schottky barrier relative to the n type semiconductor layer 3a is reduced, as shown in the energy band diagram of FIG. 6. Here, it is not necessary to increase the film thickness of the first buffer layer 6b, and the thickness of a layer of one to several atoms is sufficient.

<Manufacturing Method>

Hereinafter, one example of a manufacturing method for the light emitting device having a straight line shape according to the third embodiment in the case where ZnS is used as each light emitting material for the semiconductor layers 3a and 3b in the phosphor layer 3 is described. Here, the same manufacturing method can be used for phosphor layers made of other materials described above.

(1) Corning 1737 is prepared as the substrate 1 having a straight-line shape.
(2) The rear surface electrode 4 having a straight-line shape is formed on the substrate 1. For example, Al is used, and the thickness is 200 nm.
(3) ZnS is deposited on the rear surface electrode 4 in accordance with a vapor phase deposition method. As for conditions at this time, the temperature of the substrate is 600° C., and ZnS and Ag are deposited in a thickness of 1 μm in a gas including $NH_3$, and thus, a p type ZnS layer having a straight-line shape is formed as the p type semiconductor layer 3b.
(4) Next, ZnS and Ag are deposited on top of the p type ZnS layer 3b in accordance with a vapor phase deposition method. As for conditions at this time, the temperature of the substrate is 600° C., the thickness of deposition is 1 μm, and an n type ZnS layer having a straight-line shape is formed as the n type semiconductor layer 3a.
(5) Next, the sample is held in a high-vacuum chamber, and into the chamber a CH3F gas is introduced, and then irradiated with UV rays, and thus, the surface is coated with fluorine in a thickness of approximately one atom layer, which is the first buffer layer 6b.
(6) A straight line of ITO is deposited in a thickness of 200 nm on top of the fluorine, which is the first buffer layer 6b, as the transparent electrode 2 in accordance with a sputtering method.
(7) Subsequently, a transparent insulator layer of silicon nitride, or the like, is formed as a protective layer (not shown) which covers the entirety.

The light emitting device having a straight-line shape according to the present third embodiment can be produced through the above described process.

When the transparent electrode 2 and the rear surface electrode 4 of this light emitting device having a straight line shape according to the third embodiment are connected to a direct current power supply 5, and a direct current voltage is applied between these to evaluate a light emitting performance, it has been found that light starts being emitted when a voltage of 15 V is applied, and a brightness of light emission of approximately 600 cd/m² is exhibited at 35 V.

Here, though the present third embodiment provides a configuration provided with only a first buffer layer 6b, both the first buffer layer 6b and the second buffer layer 7 may be provided in the configuration. In addition, the method for film formation in each layer is not limited to the method described above.

<Effect>

In the light emitting device having a straight-line shape according to the present embodiment, the Schottky barrier between the phosphor layer and the electrode is low, and a required brightness of light emission can be gained with a low voltage.

Fourth Embodiment

<Schematic Configuration of Light Emitting Device Having a Straight-Line Shape>

Figure 8:
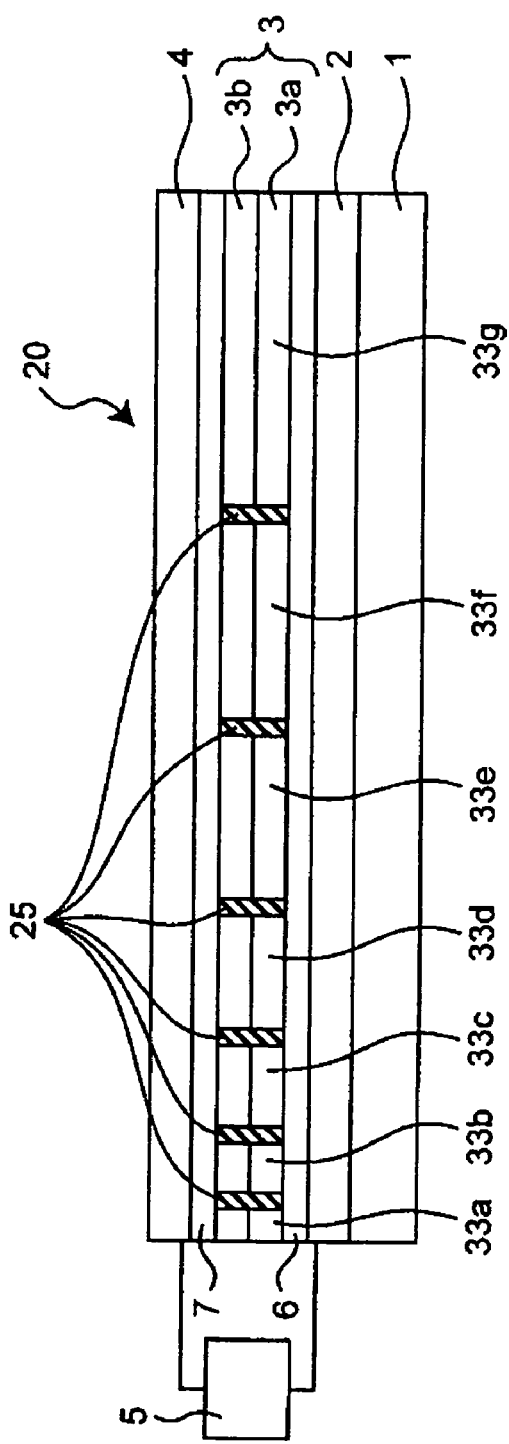
FIG. 8 is a schematic cross-sectional view showing a configuration of a light emitting device having a straight-line shape according to a fourth embodiment of the present invention.
Figure 9:
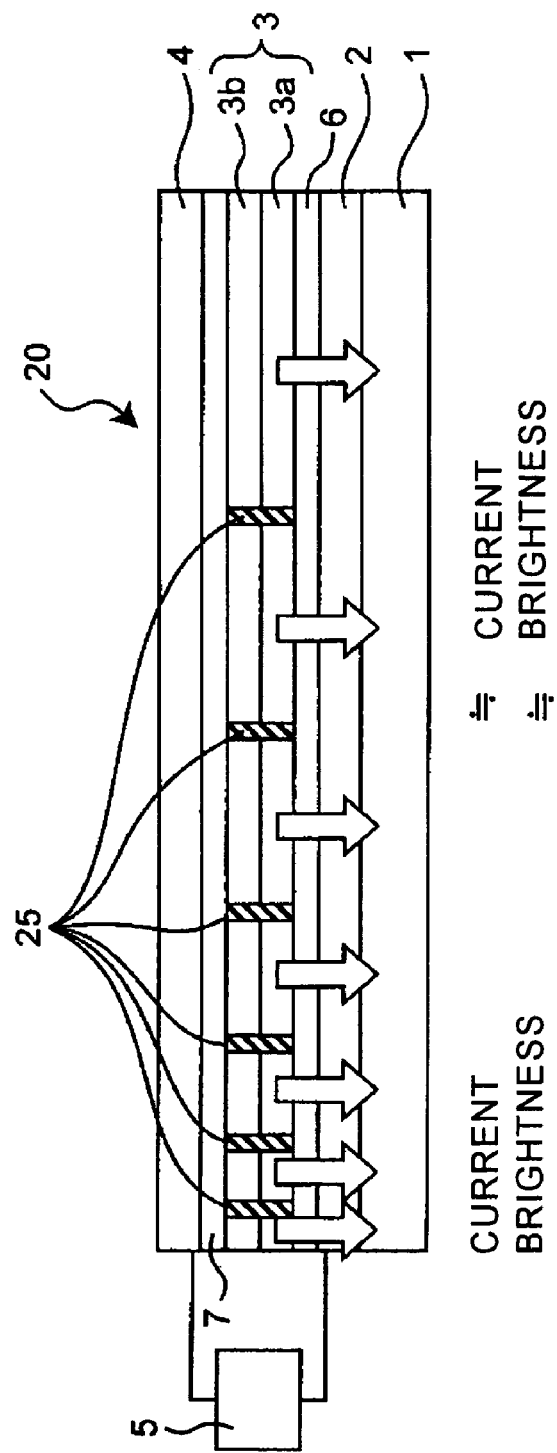
FIG. 9 is a cross-sectional view showing the brightness in each region which is divided in a phosphor layer of a light emitting device having a straight-line shape according to a fourth embodiment of the present invention.

FIG. 8 is a cross-sectional view showing a light emitting device having a straight-line shape 20 according to the fourth embodiment of the present invention in a longitudinal direction as viewed in a direction perpendicular to the light emitting surface. This light emitting device having a straight-line shape 20 functions as a light source having a straight-line shape. The light emitting device having a straight-line shape 20 is formed of the substrate 1, the transparent electrode 2, the phosphor layer 3 and the metal electrode 4, and the phosphor layer 3 is characterized by being electrically partitioned into respective regions 33a to 33g in the longitudinal direction by a plurality of insulators 25. Here, a metal electrode is used as the rear surface electrode 4. In addition, in this light emitting device having a straight-line shape 20, a voltage is applied across the transparent electrode 2 and the metal electrode 4 from the power supply 5 so that the phosphor layer 3 emits light and the light is emitted to the outside from the substrate 1 side. In this light emitting device having a straight line shape 20, the phosphor layer 3 is electrically partitioned into a plurality of regions in the longitudinal direction, in such a manner that the electrical resistance value in each of the plurality of electrical paths from the transparent electrode to the metal electrode 4 via the region 33a to 33g into which the phosphor layer 3 is partitioned is approximately the same, and thus, the brightness can be made uniform in the longitudinal direction.

<Part Characteristic to Light Emitting Device Having a Straight-Line Shape According to the Present Fourth Embodiment>

The light emitting device having a straight-line shape 20 according to the fourth embodiment of the present invention has a characteristic part in the configuration, where the phosphor layer 3 is electrically partitioned into the respective regions 33a to 33g in the longitudinal direction by a plurality of insulator 25. The present inventor found the following problems in the light emitting device having a straight line shape according to the first embodiment, and has came up with a device having the new characteristics described above in order to solve these problems.

Thus, in the following, the problems with the light emitting device having a straight-line shape according to the first embodiment as found by the present inventor are described, and then, how the above described problems are solved by the part characteristic to the present invention is described.

<Problems with Light Emitting Device Having a Straight-Line Shape According to First Embodiment>

First, the present inventor found problems with non-uniformity in the brightness in the case where the light emitting device having a straight-line shape according to the first embodiment is used as a light source having a straight-line shape. That is, since the electrical resistance in the phosphor layer 3 is low, there is a relatively large current when light is emitted. However, since the voltage drops in the transparent electrode 2 having a relatively large resistance value, and the current value in each path through which the current passes in a portion in the phosphor layer 3 gradually becomes smaller in the longitudinal direction from the terminal, which is a connection point in the transparent electrode 2, from the power supply, there is a problem such that the uniformity in the brightness is decreased.

The above problems are described in further detail in reference to FIGS. 7A and 7B. FIGS. 7A and 7B are schematic cross-sectional views showing a simplified configuration (substrate and the like are omitted) of the light emitting device having a straight-line shape. In the light emitting device having a straight line shape shown in FIG. 7A, the respective terminals, from the power supply 5 to the two electrodes 2 and 4, are respectively wired to different short sides at the two ends in the longitudinal direction, and in the light emitting device having a straight-line shape shown in FIG. 7B, the respective terminals to the two electrodes 2 and 4 are wired on the same short side. The light emitting device having a straight-line shape emits light when power is supplied to the respective electrodes 2 and 4 via the terminals from the power supply 5. Here, the flow of the current inside the light emitting device having a straight-line shape is considered. First, in terms of the resistance of the respective electrodes 2 and 4, the specific resistance of the material that forms the metal electrode 4 is much lower than the specific resistance of the material that forms the transparent electrode 2. Next, in terms of the resistance of the phosphor layer 3, the direction in which the current flows, that is, the distance between the transparent electrode 2 and the metal electrode 4, is sufficiently short, as it is the same as the thickness of the thin film phosphor layer 3, and the specific resistance of the material that forms the phosphor layer is low in comparison with that of the material that forms conventional phosphor layers. Therefore, the inside of the phosphor layer 3 has a low resistance. In addition, since the thickness of the phosphor layer 3 is substantially uniform in the longitudinal direction, the value of the resistance inside the phosphor layer 3 is substantially uniform in the longitudinal direction. Accordingly, the specific resistance of the transparent electrode 2 greatly affects the distribution of the current which flows through the phosphor layer inside the light emitting device having a straight-line shape. That is, a large current flows through portions having lower resistance, and therefore, a large current flows over a shorter distance through the transparent electrode 2. On the other hand, in the phosphor layer 3, the brightness of the emitted light is high when the current is large. In other words, the value of the current that flows through the phosphor layer 3 gradually becomes smaller and the brightness of light emitted from the phosphor layer 3 gradually becomes lower as the distance from the terminal which is the connection point in the transparent electrode 2 from the power supply 5 becomes longer in the longitudinal direction. In particular, in the phosphor layer 3 according to the present embodiment, which is formed of a material having a low resistance value in comparison with the material that forms conventional phosphor layers, the value of the current when light is emitted is high, and the effects of the voltage dropping in the transparent electrode 2 are great. In addition, the difference in the amount of current and the amount of light emission becomes great between the side which is closer to the terminal which is the connection point in the transparent electrode 2 from the power supply in the longitudinal direction and the side which is farther. Accordingly, the brightness on the right side of the light emitting device having a straight-line shape in FIG. 7A is higher than that on the left side in the longitudinal direction, while the brightness on the left side of the light emitting device having a straight-line shape in FIG. 7B is higher than that on the right side in the longitudinal direction. Here, the arrows in FIGS. 7A and 7B are imaginary depictions of the amount of current, and do not indicate the direction or the amount of current.

The above-described part characteristic to the light emitting device having a straight-line shape 20 according to the present fourth embodiment is provided in order to solve the problem with the uniformity in the brightness in the longitudinal direction being low in the case where the light emitting device having a straight-line shape is used as a light source having a straight-line shape. That is, the present invention solves the problem with the uniformity in the brightness by providing a configuration where the internal resistance in each of a plurality of paths between the pair of electrodes 2 and 4 via the phosphor layer 3 in the light emitting device having a straight-line shape varies depending on the location.

The configuration of the phosphor layer 3 in this light emitting device having a straight-line shape 20 is described below. This phosphor layer 3 is electrically partitioned into a plurality of regions 33a to 33g by a plurality of insulators 25. First, the insulators 25 are describe. Next, the arrangement of the insulators is described.

<Insulator>

The insulators 25 are formed inside the phosphor layer 3 and electrically partition the phosphor layer 3 into the regions 33a to 33g. Oxide insulators, such as of $SiO_2$ and $Al_2O_3$, and plastic resins can be used as the material for the insulators 25, but the material for the insulators is not particularly limited to these.

In addition, the method for forming the insulators 25 can include the following process, for example.

a) The phosphor layer 3 is formed in accordance with a predetermined method.

b) Portions of the formed phosphor layer 3 where insulators 25 are subsequently formed are etched away in accordance with a photolithographic method.

c) The recesses created through etching are filled in with insulators 25 in accordance with a sputtering method in the case where the recesses are filled in with $SiO_2$, or in accordance with a coating method in the case where the recesses are filled in with a resin.

d) After that, the insulators in the upper portion of the phosphor layer 3 are removed through etching or polishing.

The insulators 25 can be placed within the phosphor layer 3 through the above-described process.

Here, the process is not limited to the above-described method and, for example, a method may be used according to which the insulator 25 is formed on the transparent electrode in advance, and then the insulator 25 is patterned in accordance with a photolithography method, and the phosphor layer 3 is formed, and the phosphor layer 3 in the upper portion of the insulators 25 is flattened through polishing or the like, so that the regions 33a to 33g into which the phosphor layer 3 is partitioned by a plurality of insulators 25 can be gained.

<Arrangement of Insulators>

Next, the arrangement of a plurality of insulators 25 inside the phosphor layer 3 is described. The intervals between the insulators 25 are defined by the electrical resistance of each path. This means that the value of the electrical resistance in the paths from the terminals which are connection points provided on the transparent electrode 2 from the power supply 5 to the metal electrode 4 through the transparent electrode 2 and the phosphor layer 3 becomes approximately the same between the respective paths which include the regions 33a to 33g into which the phosphor layer 3 is partitioned by the insulators 25. That is, the closer to the terminal provided on the transparent electrode 2 inside the light emitting device having a straight-line form 20, in other words, the shorter the distance through the transparent electrode 2 is, the smaller the interval of the insulator 25 becomes, so that the electrical resistance inside the phosphor layer 3 increases. On the other hand, the farther the distance from the terminal provided on the transparent electrode 2, in other words, the longer the distance through the transparent electrode 2 is, the larger the interval of the insulators 25 becomes, so that the electrical resistance inside the phosphor layer 3 can be lowered. Here, since the distance through which the transparent electrode 2 passes is short in a location close to the connection terminal side, the electrical resistance of the transparent electrode 2 is low. Since the distance through which the transparent electrode 2 passes is long in a location at a distance from the connection terminal side, the electrical resistance of the transparent electrode 2 is high. Therefore, the intervals of the insulators 25 are determined so that the total value of the electric resistance as determined by the intervals of the insulators 25 and the distance through which the transparent electrode 2 passes becomes approximately equal between the paths through the respective regions 33a to 33g into which the phosphor layer 3 is partitioned.

In FIG. 8, the phosphor layer 3 is partitioned into the regions 33a to 33g as described above, and the current that flows through each region becomes approximately equal, as shown through imaginary depiction in FIG. 8. As described above, the current that flows through the phosphor layer 3 in each location 33a to 33g in the light emitting device having a straight-line shape 20 becomes approximately the same, and thus, the brightness of light emission from 12a to 12g can be made uniform. As a result, the level of uniformity in the brightness in the light emitting device having a straight-line shape 20 increases.

Figure 10:
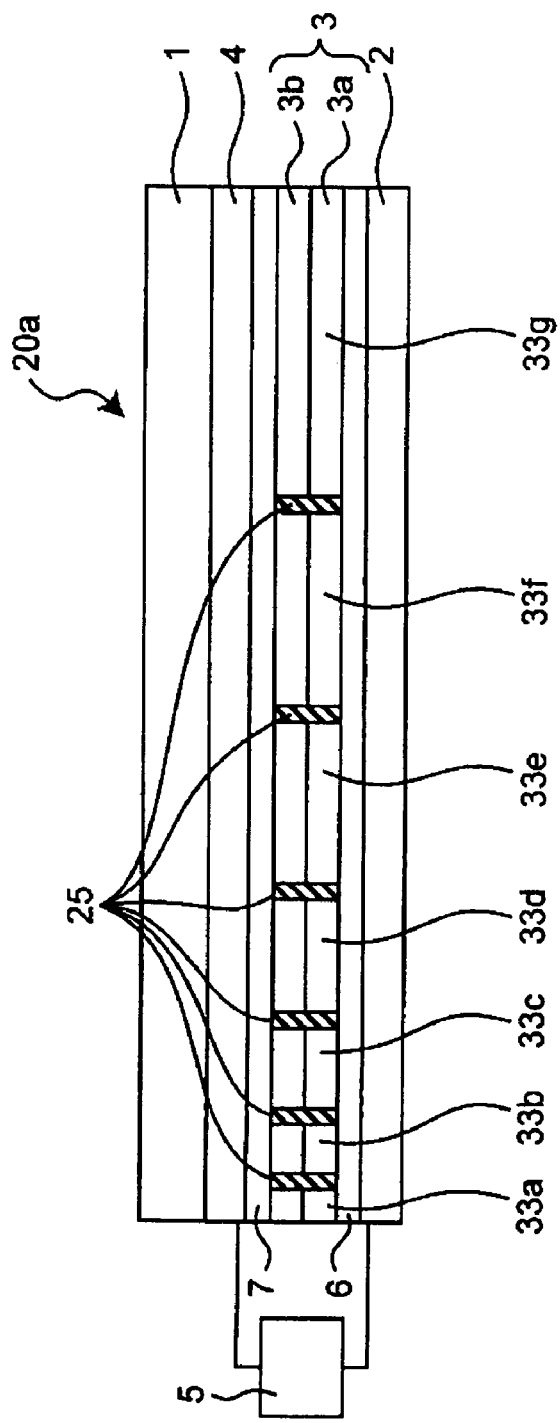
FIG. 10 is a schematic cross-sectional view showing a configuration of a light emitting device having a straight-line shape according to another example.

Here, though the substrate 1 is arranged on the transparent electrode 2 side in the light emitting device having a straight line shape 20 in FIG. 8, the substrate 1 may be provided on the metal electrode 4 side, as in a light emitting device having a straight-line shape 20a shown in FIG. 10. In this case, the substrate 1 may not have light transmitting properties, and the same material as that used for the substrate 1 can be used in addition to a silicon (Si) substrate, a ceramic substrate, a metal substrate or the like. In addition, in the case where the substrate 1 has conductivity, for example, where the substrate is a metal substrate of Al, or the like, it is possible for the substrate 1 and the metal electrode 4 to be integrated. Furthermore, the terminal to which the power supply 5 is connected may be located on the short side, on the opposite side in the longitudinal direction in the metal electrode 4.

Furthermore, the present fourth embodiment is characterized in that the phosphor layer 3 is electrically partitioned into a plurality of regions 33a to 33g by the insulators 25, and the quality, configuration and material shown herein are merely examples, and the invention is not particularly limited to these. In addition, the first buffer layer 6 and/or the second buffer layer 7 may be electrically partitioned together by the insulators 25, in addition to the phosphor layer 3.

Here, as the first embodiment, the light emitting device having a straight-line shape 20 is also characterized in that the first and second buffer layers 6 and 7 are inserted between the semiconductor layers 3a and 3b and the electrodes 2 and 4, respectively, that form the phosphor layer 3. As a result, the height of the Schottky barrier between the transparent electrode 2 and the n type semiconductor layer 3a and the Schottky barrier between the rear surface electrode 4 and the p type semiconductor layer 3b can respectively be reduced.

Fifth Embodiment

Figure 11:
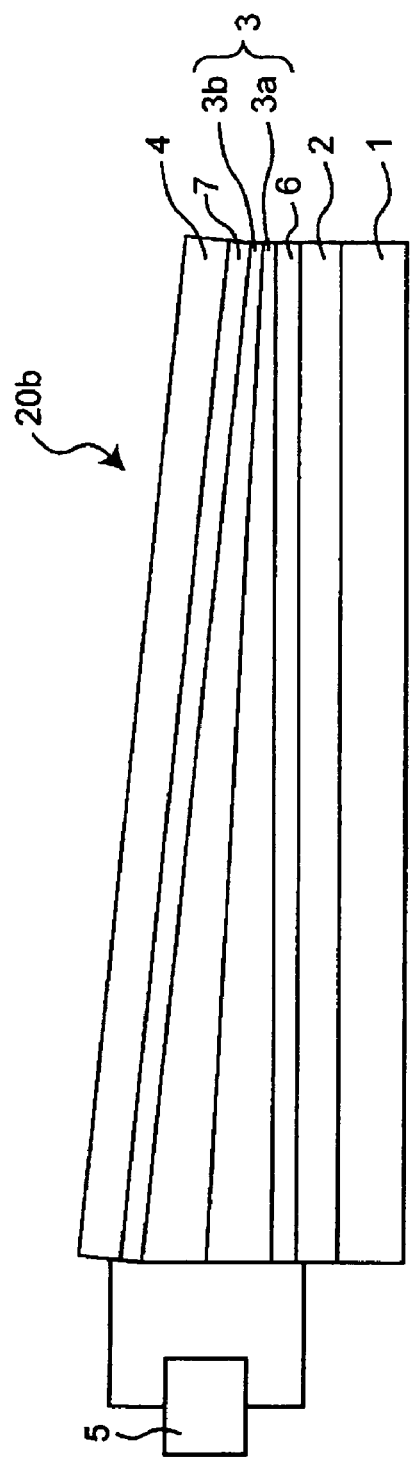
FIG. 11 is a cross-sectional view showing a configuration of a light emitting device having a straight-line shape according to a fifth embodiment of the present invention.

FIG. 11 is a schematic cross-sectional view showing a configuration of a light emitting device having a straight-line shape 20b according to the fifth embodiment. This light emitting device having a straight-line shape 20b is different from the light emitting device having a straight-line shape according to the fourth and fifth embodiments in that the film thickness of the phosphor layer 3 varies in the longitudinal direction. That is, in this light emitting device having a straight-line shape 20b, the film thickness of the phosphor layer 3 continuously varies in a linear function manner in the longitudinal direction, and thus, the electrical resistance of each path from the terminal provided in the transparent electrode to the terminal provided on the metal electrode 4 through the transparent electrode 2, a portion of the phosphor layer 3 and the metal electrode 4 can be made approximately the same. This can be achieved by increasing the film thickness of the phosphor layer 3 so that the electrical resistance in the phosphor layer 3 increases as the location becomes closer to the terminal of the transparent electrode 2 in the longitudinal direction. On the other hand, the film thickness of the phosphor layer 3 is reduced so that the electrical resistance of the phosphor layer 3 is decreased as the distance becomes greater from the terminal. As a result, the level of uniformity in the brightness in the light emitting device having a straight-line shape 20b can be increased in the longitudinal direction.

Figure 12:
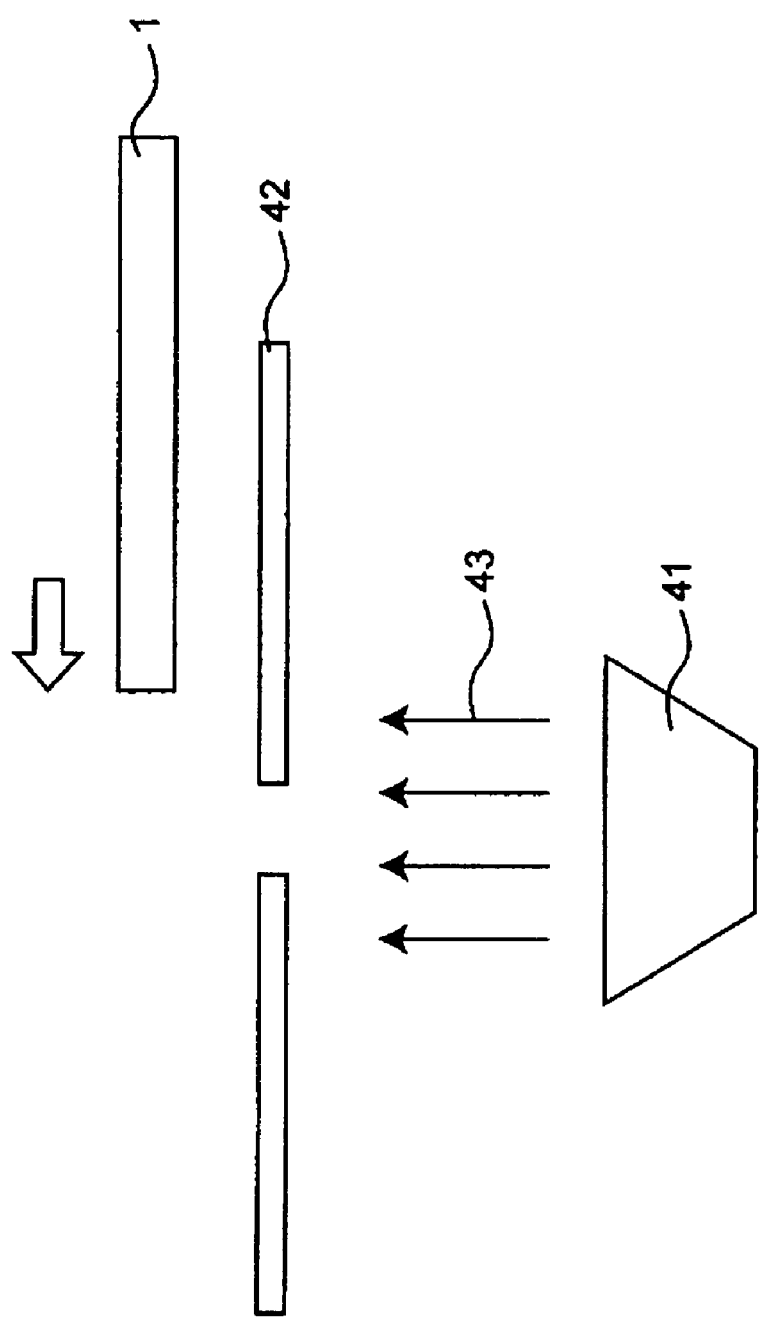
FIG. 12 is a schematic view showing a configuration of a manufacturing device for the light emitting device having a straight-line shape according to the fifth embodiment of the present invention.

FIG. 12 is a schematic view showing a configuration of a manufacturing apparatus for the light emitting device having a straight-line shape 20b according to the fifth embodiment. The manufacturing apparatus for the light emitting device having a straight line shape 20b is provided with a vapor deposition source 41, a mask 42 provided with a slit through which vapor 43 from the vapor deposition source 41 for the formation of a phosphor layer partially passes, and a substrate moving apparatus for passing the substrate 1 on the side of the above described mask 42 opposite to the vapor deposition source 41 at various speeds. The vapor deposition source 41 is made of the material for formation of the phosphor layer 3. When the vapor deposition source 41 is heated in accordance with an EB method or a resistance heating method, the vapor 43 evaporates to the mask 42 side. The mask 42 has an opening above the slit. The substrate 1 with an electrode can be moved in the direction of the arrow above the mask 42 by means of the substrate moving apparatus, so that the phosphor layer 3 is formed on the substrate 1 only in the portion which passes through the opening above the slit in the mask 42. Therefore, the speed at which the substrate 1 moves varies, and thus, the film thickness of the phosphor layer 3 can vary in the longitudinal direction.

<Concerning Control of Film Thickness of Phosphor Layer>

Next, the method for forming the phosphor layer 3 in the light emitting device having a straight-line shape 20b is described in reference to FIG. 12. A sputtering method or a vapor deposition method can be used as the method for forming the phosphor layer 3. As described above, the film thickness of the phosphor layer 3 may continuously vary in the longitudinal direction when the speed at which the substrate 1 moves is varied. The amount of variation in the film thickness of the phosphor layer 3 in the longitudinal direction varies in accordance with the distance of the transparent electrode 2 from the connection terminal. That is, it is preferable for the film thickness to be set so that the electrical resistance value in each path from the connection terminal of the transparent electrode 2 to the metal electrode 4 through the transparent electrode 2 and the phosphor layer 3 becomes approximately the same. Concretely, the film thickness of the phosphor layer 3 on the connection terminal side of the transparent electrode 2 is set high, and the film thickness of the phosphor layer 3 on the side opposite to the connection terminal is set small. As a result, since it becomes possible for the current which flows through the phosphor layer 30 in each path of the light emitting device having a straight-line shape 20b to be the same, the level of uniformity in the brightness of light emitted from the light emitting device having a straight-line shape 20b increases.

Here, in the present fifth embodiment also, the substrate may be provided on the metal electrode 4 side, as in the first embodiment.

Sixth Embodiment

Figure 13:
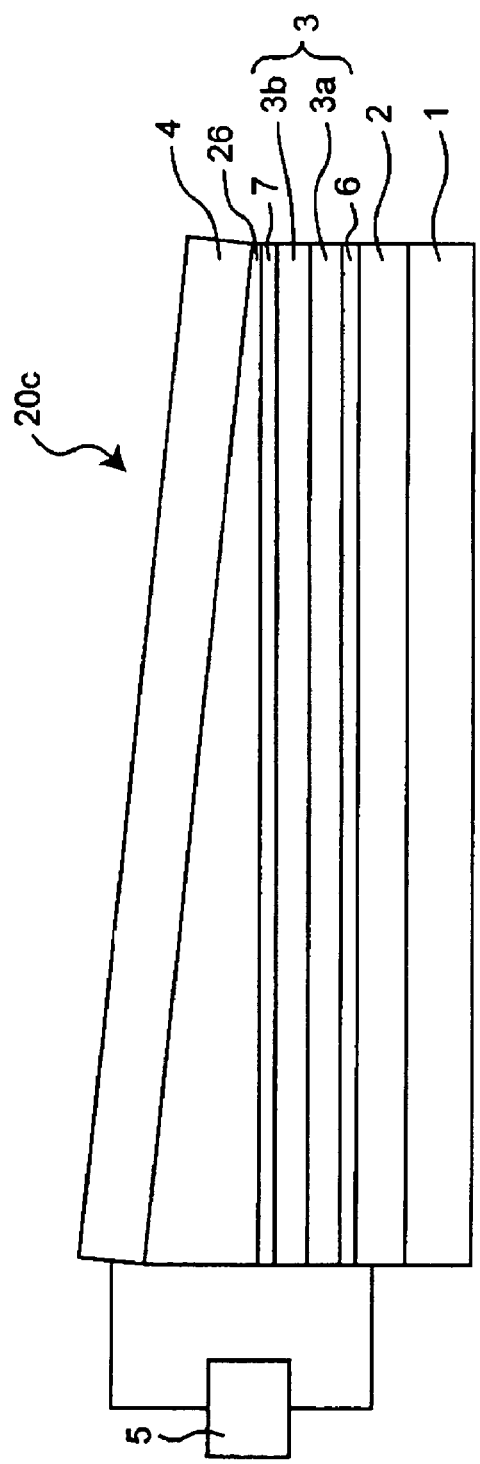
FIG. 13 is a cross-sectional view showing a configuration of a light emitting device having a straight-line shape according to a sixth embodiment of the present invention.
Figure 15B:
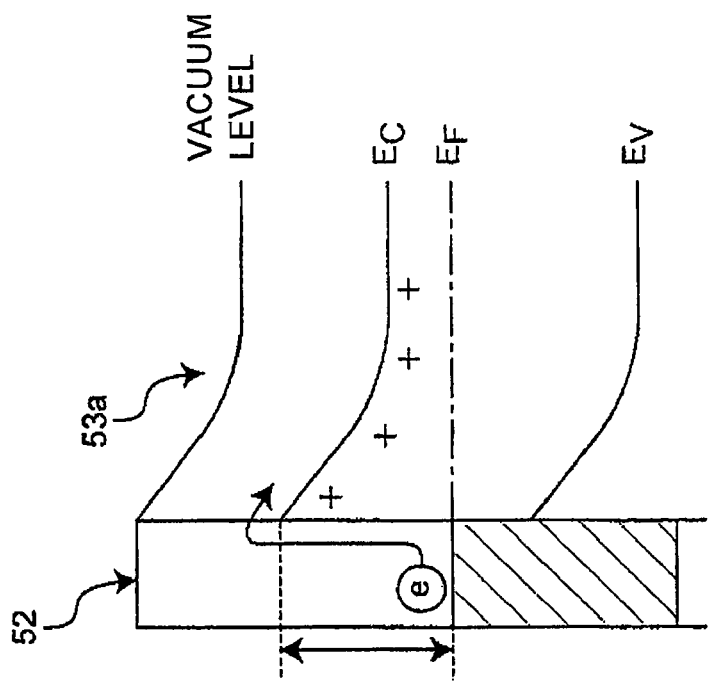
FIG. 15B is an energy band diagram after the two are brought into contact with each other.
Figure 15A:
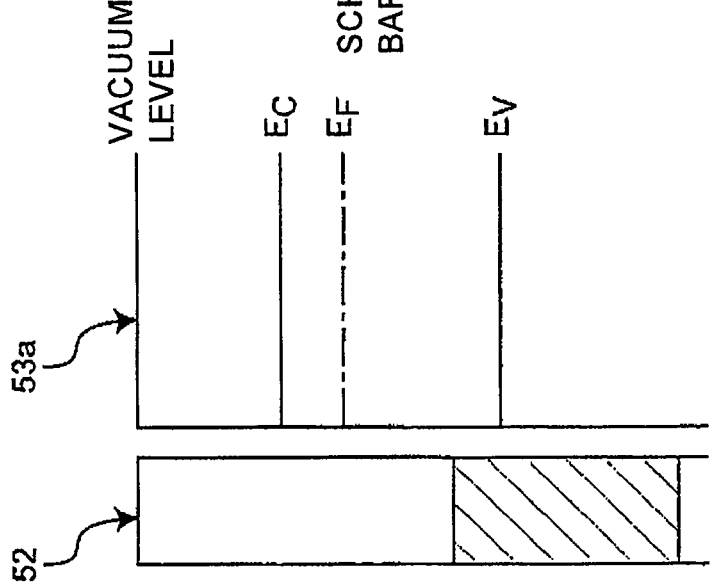
FIG. 15A is an energy band diagram before a first electrode, which is an electron injecting electrode, and an n type semiconductor layer in the conventional light emitting element are brought into contact with each other.
Figure 16A:
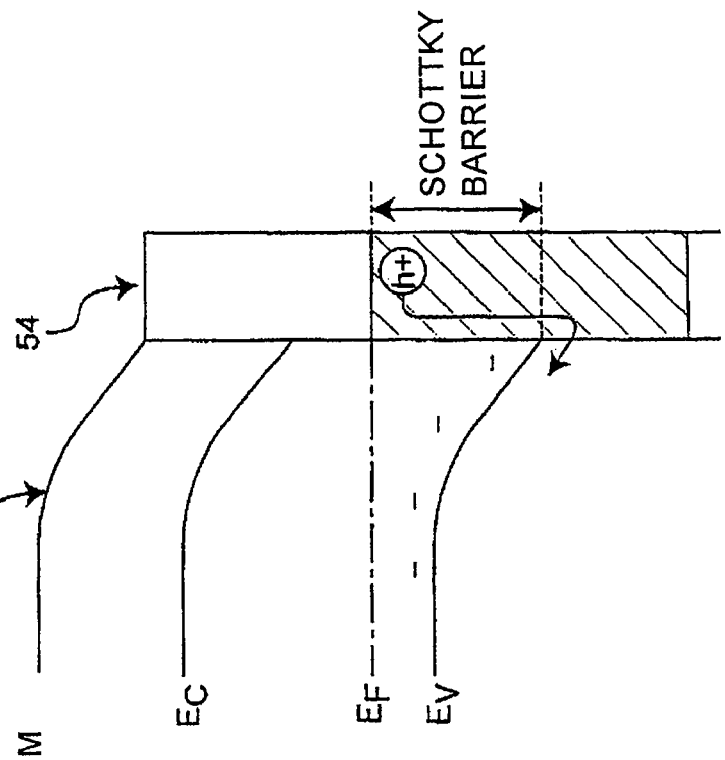
FIG. 16A is an energy band diagram before a second electrode, which is a hole injecting electrode, and a p type semiconductor layer in the conventional light emitting element are brought into contact with each other.
Figure 16B:
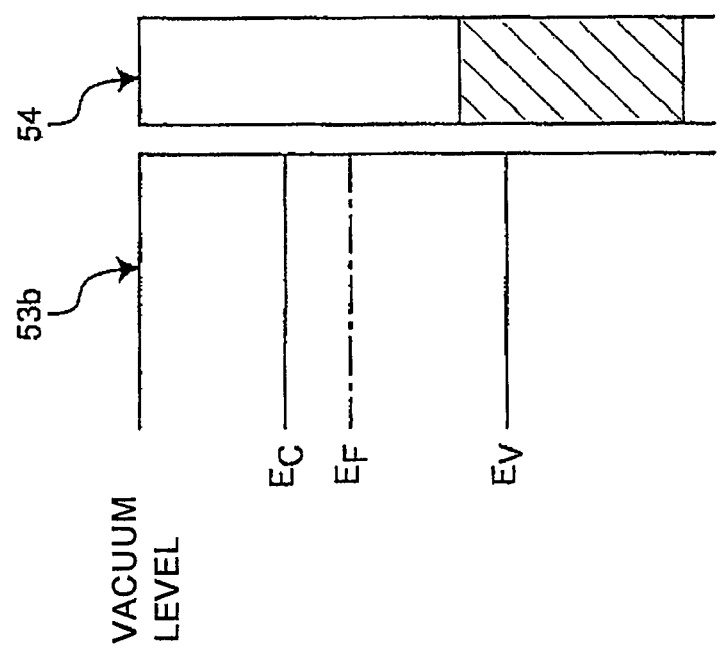
FIG. 16B is an energy band diagram after the two are brought into contact with each other.

FIG. 13 is a schematic cross-sectional view showing a configuration of a light emitting device having a straight-line shape 20c according to the sixth embodiment. The light emitting device having a straight-line shape 20c according to the sixth embodiment of the present invention is characterized in that an electrical resistance adjusting layer 26 is provided between the phosphor layer 3 and the metal electrode 4. In this electrical resistance adjusting layer 26, the resistance value in the direction o the thickness becomes smaller as the distance from the terminal provided on the transparent electrode 2 becomes greater in the longitudinal direction. Concretely, the film thickness of the electrical resistance adjusting layer 26 becomes continuously smaller in a linear function manner as the distance from the terminal provided on the transparent electrode 2 becomes greater in the longitudinal direction. The current density of the phosphor layer 3 can be made constant in the longitudinal direction by means of this electrical resistance adjusting layer 26, and thus, the brightness can be made uniform in the longitudinal direction. That is, the electrical resistance of each path from the terminal provided on the transparent electrode 2 to the terminal provided on the metal electrode 4 through the transparent electrode 2, the phosphor layer 3 and the metal electrode 4 can be made the same by providing the electrical resistance adjusting layer 26, irrespectively of the distance from the terminal provided on the transparent electrode 2 in the longitudinal direction. In this electrical resistance adjusting layer 26, the resistivity of the material must be higher than that of the metal electrode 4, and it is preferable for it to be close to the resistivity of the material for the phosphor layer or the material for the transparent electrode.

Here, though in the light emitting device having a straight line shape 20c according to the present sixth embodiment, the film thickness of the electric resistance adjusting layer 26 continuously varies in the longitudinal direction, and thus, the resistance value in the direction of the thickness varies, the material, the configuration and the method for formation for each component shown herein are merely examples, and the invention is not particularly limited to these.

The present invention is described above in detail using preferred embodiments, however, the present invention is not limited to these. It will be obvious to those skilled in the art that may preferable modifications and correction are possible within the technical scope of the invention described in the following claims.

The light emitting device having a straight-line shape according to the present invention provides a light source having a straight-line shape with a high level of uniformity in the brightness, and particularly provides a light source having a straight-line shape with a high level of uniformity in the brightness. In particular, the invention can be applied to a light source having a straight-line shape for a light source for a backlight in a liquid crystal display.

What is claimed is:

1. A light emitting device having a straight-line shape, comprising:
    a pair of first and second electrodes each having a straight-line shape which face each other; and
    a phosphor layer having a straight-line shape provided so as to be sandwiched between the pair of electrodes, wherein:
    at least one of the pair of first and second electrodes is a transparent electrode,
    the light emitting device having a straight-line shape further comprising at least one buffer layer provided so as to be sandwiched between the first or second electrode and the phosphor layer,
    the height of a potential barrier between the first electrode or second electrode and the phosphor layer via the buffer layer, the buffer layer being sandwiched between the first electrode or the second electrode and the phosphor layer, is lower than the height of a Schottky barrier between the first electrode or second electrode and the phosphor layer, which are directly connected without the buffer layer,
    a direct current voltage is applied between the first and second electrodes to emit light, one electrode of the first and second electrodes functions as an electron injecting electrode and the other electrode functions as a hole injecting electrode, and
    the buffer layer comprises at least one buffer layer of:
    a first buffer layer provided between the electron injecting electrode and the phosphor layer; and
    a second buffer layer provided between the hole injecting electrode and the phosphor layer.

2. The light emitting device having a straight-line shape according to claim 1, wherein the first and second electrodes are provided to have an electrical resistance value between the first and second electrodes which varies in a longitudinal direction in the phosphor layer.

3. The light emitting device having a straight-line shape according to claim 1, wherein the phosphor layer is partitioned into a plurality of regions by a plurality of insulators provided between the pair of electrodes.

4. The light emitting device having a straight-line shape according to claim 1, wherein the film thickness of the phosphor layer varies in a longitudinal direction.

5. The light emitting device having a straight-line shape according to claim 1, further comprising an electrical resistance adjusting layer provided so as to be sandwiched between at least one electrode of the first and second electrodes and the phosphor layer and having a variable electrical resistance value in a longitudinal direction.

6. The light emitting device having a straight-line shape according to claim 5, wherein the film thickness of the electrical resistance adjusting layer varies in the longitudinal direction.

7. The light emitting device having a straight-line shape according to claim 1, wherein the transparent electrode is provided with a terminal connected to a power supply at one end of the two ends in the longitudinal direction.

8. The light emitting device having a straight-line shape according to claim 1, wherein
    the buffer layer comprises two buffer layers:
        a first buffer layer provided between the electron injecting electrode and the phosphor layer; and
        a second buffer layer provided between the hole injecting electrode and the phosphor layer.

9. The light emitting device having a straight-line shape according to claim 8, wherein the first buffer layer includes a substance having a work function of 3.5 eV or lower.

10. The light emitting device having a straight-line shape according to claim 8, wherein the second buffer layer includes a substance having a work function of 5.0 eV or higher.

11. The light emitting device having a straight-line shape according to claim 8, wherein the first buffer layer includes an alkali metal oxide.

12. The light emitting device having a straight-line shape according to claim 8, wherein the first buffer layer is formed of a substance having an electronegativity of 3 or more.

13. The light emitting device having a straight-line shape according to claim 1, wherein the phosphor layer is a two-layer type phosphor layer where an n type semiconductor layer and a p type semiconductor layer are stacked.

14. The light emitting device having a straight-line shape according to claim 1, wherein the phosphor layer is a three-layer type phosphor layer formed of an n type semiconductor layer, a p type semiconductor layer and an undoped semiconductor layer sandwiched therebetween.

15. The light emitting device having a straight-line shape according to claim 1, further comprising a color converting layer which faces the first and second electrodes and is placed to the front in a light emitting direction from the phosphor layer.

16. A plane light source, comprising:

the light emitting device having a straight-line shape according to claim 1, and a light guide plate for reflecting light having a straight-line shape outputted from the light emitting device having a straight-line shape so as to convert the light in a straight-line shape into light in a plane shape.

\* \* \* \* \*